(12) United States Patent
Saburi et al.

(10) Patent No.: US 12,451,776 B2
(45) Date of Patent: Oct. 21, 2025

(54) ROTOR MANUFACTURING APPARATUS AND ROTOR MANUFACTURING METHOD

(71) Applicant: AISIN CORPORATION, Aichi (JP)

(72) Inventors: Toshiyuki Saburi, Kariya (JP); Yohei Oya, Kariya (JP); Motoki Kori, Kariya (JP); Naotaka Hayashi, Kariya (JP)

(73) Assignee: AISIN CORPORATION, Kariya (JP)

( * ) Notice: Subject to any disclaimer, the term of this patent is extended or adjusted under 35 U.S.C. 154(b) by 137 days.

(21) Appl. No.: 18/031,081

(22) PCT Filed: Oct. 30, 2020

(86) PCT No.: PCT/JP2020/040985
§ 371 (c)(1),
(2) Date: Apr. 10, 2023

(87) PCT Pub. No.: WO2022/091389
PCT Pub. Date: May 5, 2022

(65) Prior Publication Data
US 2023/0378858 A1    Nov. 23, 2023

(30) Foreign Application Priority Data
Oct. 29, 2020 (JP) .................................. 2020-181916

(51) Int. Cl.
*H02K 15/12* (2025.01)
*H02K 1/28* (2006.01)
*H02K 15/03* (2025.01)

(52) U.S. Cl.
CPC ............. *H02K 15/12* (2013.01); *H02K 1/28* (2013.01); *H02K 15/03* (2013.01); *H02K 2215/00* (2021.08)

(58) Field of Classification Search
CPC .......... H02K 15/12; H02K 1/28; H02K 15/03; H02K 2215/00; B29C 45/14467; B29C 45/14639
See application file for complete search history.

(56) References Cited

U.S. PATENT DOCUMENTS

| 9,246,365 B2* | 1/2016 | Honda ..................... H02K 1/28 |
| 9,755,489 B2* | 9/2017 | Takemoto ............ H02K 1/2766 |
| 10,079,529 B2* | 9/2018 | Masubuchi .......... H02K 1/2766 |

(Continued)

FOREIGN PATENT DOCUMENTS

| JP | 2007-318942 A | 12/2007 |
| JP | 4948040 B2 | 6/2012 |

(Continued)

OTHER PUBLICATIONS

Dec. 8, 2020 Search Report issued in International Patent Application No. PCT/JP2020/040985.

(Continued)

*Primary Examiner* — Nahida Sultana
(74) *Attorney, Agent, or Firm* — Oliff PLC

(57) ABSTRACT

A resin injection apparatus configured to manufacture a rotor of a rotary electric machine includes a resin injector having an ejection port for ejecting a resin, and a runner having a charging port connectable to the ejection port, and a plurality of ejection ports communicating with the charging port and disposed at positions associated with hole portions of a rotor core where magnets are disposed.

9 Claims, 15 Drawing Sheets

(56) References Cited

U.S. PATENT DOCUMENTS

| | | | |
|---|---|---|---|
| 10,601,268 B2 * | 3/2020 | Yamada | H02K 15/12 |
| 10,615,673 B2 | 4/2020 | Mabu et al. | |
| 10,707,732 B2 * | 7/2020 | Uda | H02K 15/12 |
| 10,873,249 B2 | 12/2020 | Okudaira et al. | |
| 11,393,623 B2 * | 7/2022 | Fukumoto | B29C 45/02 |
| 2005/0256612 A1 * | 11/2005 | Linehan | G05D 23/1932 |
| | | | 700/277 |
| 2012/0225148 A1 * | 9/2012 | Tabassi | B29C 45/281 |
| | | | 425/3 |
| 2018/0048220 A1 | 2/2018 | Mabu et al. | |
| 2018/0062488 A1 | 3/2018 | Okudaira et al. | |
| 2018/0183305 A1 | 6/2018 | Kino | |
| 2019/0047189 A1 | 2/2019 | Nishida et al. | |
| 2019/0358878 A1 * | 11/2019 | Lee | B29C 45/281 |
| 2020/0412213 A1 * | 12/2020 | Katsuki | H02K 1/276 |
| 2022/0140708 A1 * | 5/2022 | Hiramatsu | H01F 41/005 |
| | | | 310/152 |

FOREIGN PATENT DOCUMENTS

| | | |
|---|---|---|
| JP | 2012-228032 A | 11/2012 |
| JP | 2013-59185 A | 3/2013 |
| JP | 2015-42028 A | 3/2015 |
| JP | 2018-26958 A | 2/2018 |
| WO | 2016/147211 A1 | 9/2016 |
| WO | 2020/196768 A1 | 10/2020 |

OTHER PUBLICATIONS

Feb. 16, 2024 Extended Search Report issued in European Patent Application No. 20959904.2.

* cited by examiner

ROTOR MANUFACTURING APPARATUS AND ROTOR MANUFACTURING METHOD

TECHNICAL FIELD

The present technology relates to a rotor manufacturing apparatus and a rotor manufacturing method for manufacturing a rotor of a rotary electric machine.

BACKGROUND ART

In general, an interior permanent magnet (IPM) motor is used as a rotary electric machine mounted on a vehicle such as a hybrid vehicle or an electric vehicle. When manufacturing a rotor of such a rotary electric machine, a rotor core (stacked iron core) is formed by stacking stacked steel sheets with holes, magnets are inserted into the holes, and the magnets are fixed to the rotor core by injecting a thermosetting resin into the holes and heating the thermosetting resin, thereby obtaining a rotor having the magnets embedded in the rotor core. When injecting the resin into the holes of the rotor core in this manner, the holes in the rotor core in which the magnets are disposed are aligned with nozzles of a resin injector, and then the resin is injected directly into the holes from the nozzles (see Patent Document 1).

RELATED ART DOCUMENTS

Patent Documents

Patent Document 1: Japanese Unexamined Patent Application Publication No. 2012-228032 (JP 2012-228032 A)

SUMMARY OF THE DISCLOSURE

Problem to be Solved by the Disclosure

In recent years, a variety of rotary electric machines have been used in hybrid vehicles, electric vehicles, and the like, and the shapes of the rotors of the rotary electric machines, in particular, the positions of the holes in which the magnets are disposed differ from product to product. If one resin injection apparatus handles the different rotor shapes, however, the resin injector needs to be changed greatly to change, for example, the positions of the nozzles, which leads to a problem of hindrance to cost reduction.

Therefore, it is an object to provide a rotor manufacturing apparatus and a rotor manufacturing method capable of manufacturing rotors with different hole positions by using the same resin injector while eliminating the need to change the resin injector.

Means for Solving the Problem

The rotor manufacturing apparatus is
a rotor manufacturing apparatus configured to manufacture a rotor of a rotary electric machine.
The rotor manufacturing apparatus includes:
a resin injector having a first ejection port for ejecting a resin; and
a runner having a charging port connectable to the first ejection port, and a plurality of second ejection ports communicating with the charging port and disposed at positions associated with hole portions of a rotor core where magnet members are disposed.

The rotor manufacturing method is
a rotor manufacturing method for manufacturing a rotor of a rotary electric machine by disposing magnet members in hole portions of a rotor core and injecting and curing a resin to fix the magnet members to the rotor core.
The rotor manufacturing method includes:
an injection apparatus placement step for placing the rotor core on a placement portion; and
a resin injection step for attaching, to the placement portion, a runner attachable to and detachable from the placement portion, connecting, to a charging port of the runner, a first ejection port for ejecting the resin in a resin injector, and injecting the resin from the resin injector into the hole portions of the rotor core through a plurality of second ejection ports disposed at positions on the runner that are associated with the hole portions of the rotor core.

By replacing the runner in conformity to the shape of the rotor core, the rotors with different hole positions can be manufactured by the same resin injector while eliminating the need to change the resin injector. Thus, the cost can be reduced.

MODES FOR CARRYING OUT THE DISCLOSURE

The present embodiment will be described below with reference to the drawings.

[Schematic Structure of Rotor]

Figure 2:
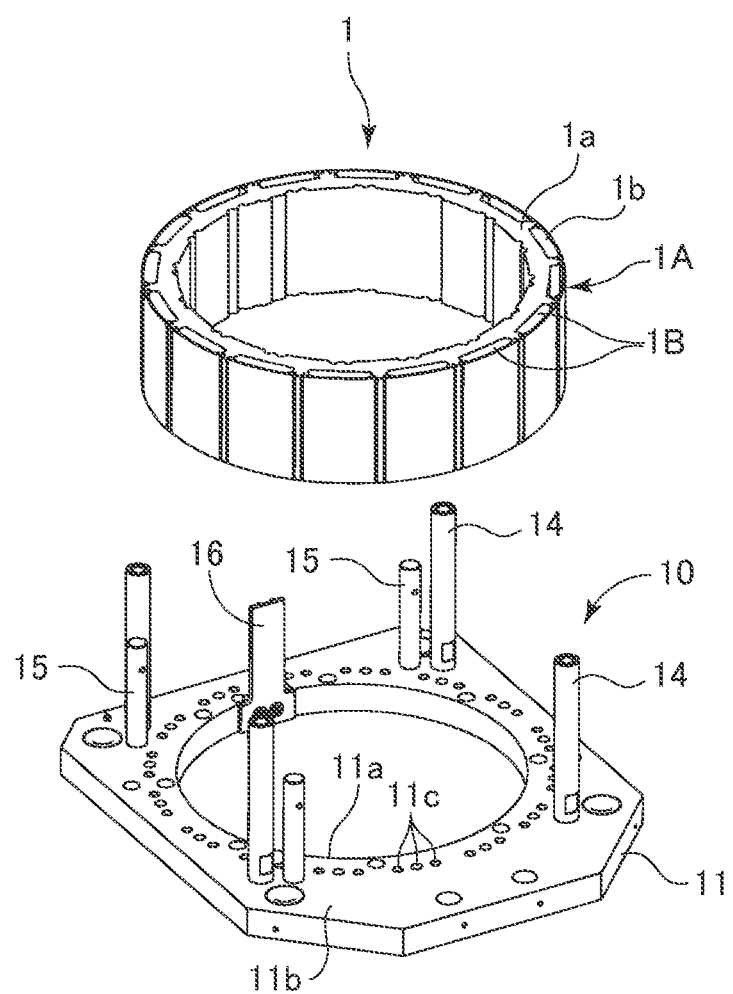
FIG. 2 is a perspective view showing a rotor core and a lower plate of a holding jig.
Figure 3:
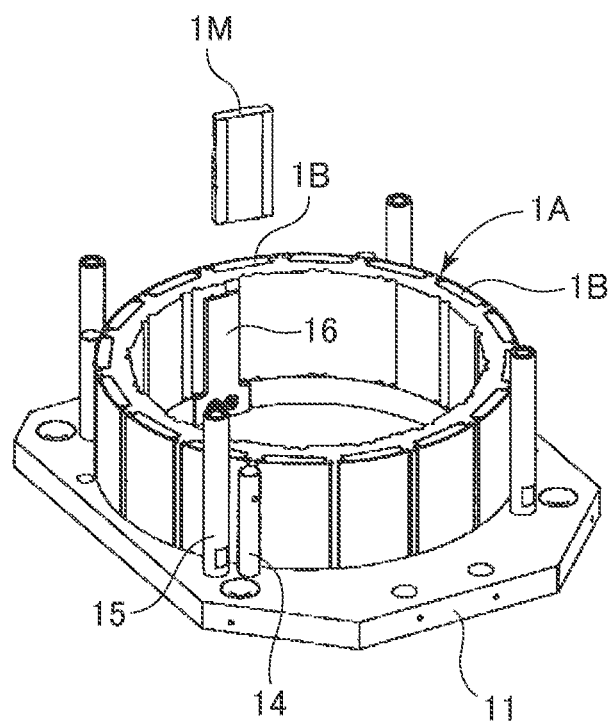
FIG. 3 is a perspective view showing a state in which the rotor core is placed on the lower plate of the holding jig.

First, brief description will be given of the structure of a rotor in, for example, a drive motor (rotary electric machine) of a hybrid drive system or an electric vehicle. The drive motor broadly includes a stator (stationary element) and a rotor 1 (rotary element). As shown in FIG. 2, the rotor 1 includes a rotor core 1A formed by stacking stacked steel sheets 1a each having a plurality of holes 1b formed by press working or the like. A plurality of hole portions 1B is formed in the rotor core 1A by stacking the stacked steel sheets 1a in a stacking direction with the holes 1b aligned in phase. As shown in FIG. 3, magnets 1M serving as magnet members are inserted and disposed in the hole portions 1B, respectively. In this state, the magnets 1M are fixed to the respective hole portions 1B with a resin, thereby forming the rotor 1 having the magnets 1M embedded in the rotor core 1A.

[Outline of Rotor Manufacturing Method]

Figure 1:
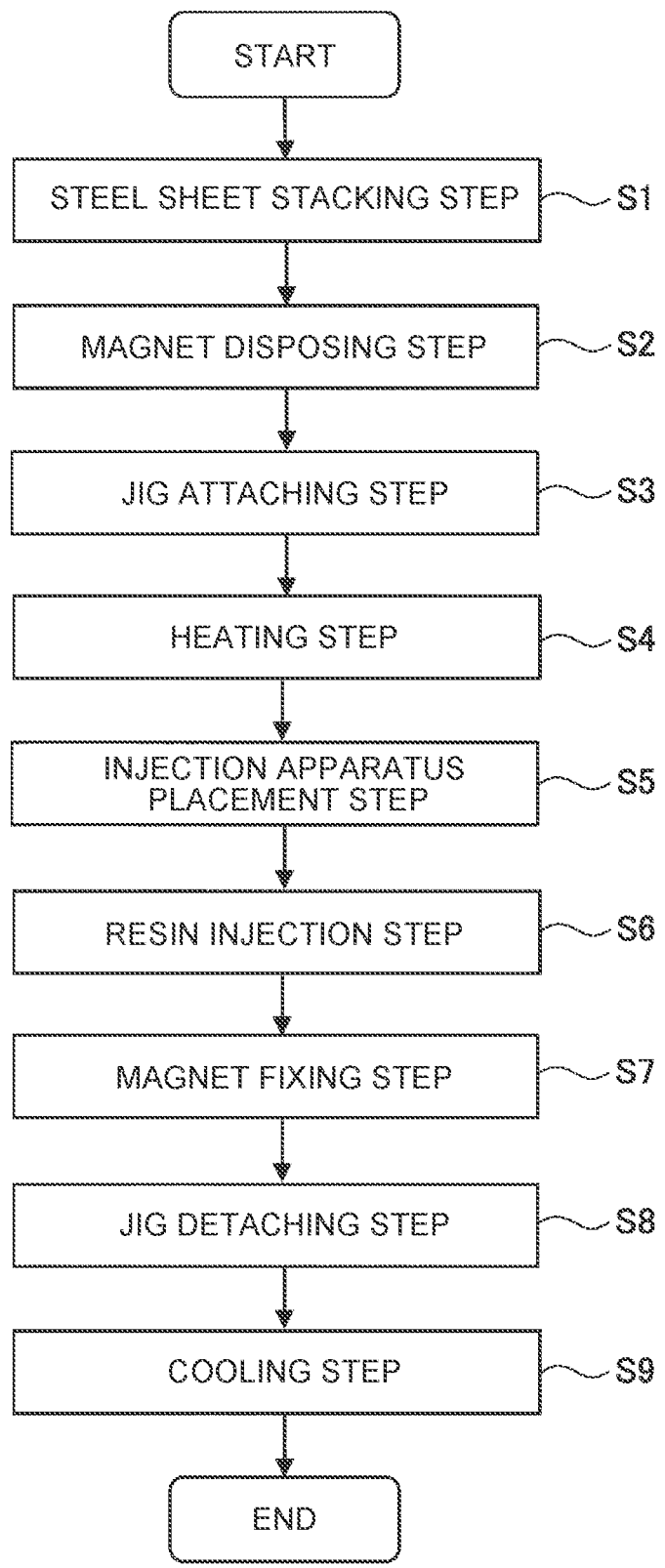
FIG. 1 is a flowchart showing steps of a rotor manufacturing method according to the present embodiment.

Next, an outline of a rotor manufacturing method according to the present embodiment will be described. As shown in FIG. 1, the rotor manufacturing method includes a steel sheet stacking step S1 for stacking the stacked steel sheets 1a to form the rotor core 1A, a magnet disposing step S2 for inserting and disposing the magnets 1M in the hole portions 1B of the rotor core 1A, and a jig attaching step S3 for attaching a holding jig 10 to the rotor core 1A. The rotor manufacturing method further includes a heating step S4 for heating the rotor core 1A, an injection apparatus placement step S5 for placing the rotor core 1A on a resin injection apparatus 30 for injecting a resin, and a resin injection step S6 for causing the resin injection apparatus 30 to inject the resin into the hole portions 1B of the rotor core 1A. The rotor manufacturing method further includes a magnet fixing step S7 for fixing the magnets 1M to the rotor core 1A by curing the injected resin, a jig detaching step S8 for detaching the holding jig 10 from the rotor core 1A, and a cooling step S9 for cooling the rotor core 1A. These steps are sequentially performed in a factory line while moving the rotor core 1A by, for example, a belt conveyor. When stacking the stacked steel sheets 1a in the steel sheet stacking step S1 described later, an operator performs adjustment. In the other steps, the conveyance of the rotor core 1A, the attachment and detachment of the holding jig 10, and the like are performed by factory equipment such as articulated robots.

[Details of Steel Sheet Stacking Step]

First, details of the steel sheet stacking step S1 will be described with reference to FIG. 2. As shown in FIG. 2, the rotor core 1A is formed, for example, by press working into a hollow disc shape that is point-symmetrical about the center. The rotor core 1A is formed by stacking the stacked steel sheets 1a each having the plurality of holes 1b while sequentially laying the stacked steel sheets 1a on an upper surface 11b of a lower plate 11 of the holding jig 10 detailed later. The stacked steel sheets 1a have a slight tolerance. Therefore, the operator stacks the stacked steel sheets 1a while adjusting the phase in a circumferential direction of the hollow disc shape. Thus, the stacked steel sheets 1a are stacked so that the uppermost stacked steel sheet 1a has less inclination with respect to a plane orthogonal to the stacking direction (that is, a horizontal direction). The stacked steel sheets 1a may be stacked on the upper surface 11b of the lower plate 11 of the holding jig 10 as described above, or may be stacked at a different place to form the rotor core 1A and then placed on the upper surface 11b of the lower plate 11 of the holding jig 10.

The lower plate 11 of the holding jig 10 is a hollow plate-shaped member having a hole 11a formed at the center. A support plate 16 for positioning and supporting the rotor core 1A is fixed to the hole 11a. First shafts 14 and second shafts shorter than the first shafts 14 are provided upright, for example, at four positions on the lower plate 11. Therefore, when the rotor core 1A is placed on the upper surface 11b of the lower plate 11, the support plate 16 abuts against a part of the inner peripheral surface of the rotor core 1A, and the second shafts 15 abut against a part of the outer peripheral surface. Thus, the rotor core 1A is supported on the lower plate 11 while restricting horizontal movement and determining the relative positions of the lower plate 11 and the rotor core 1A. The lower plate 11 has a plurality of air holes 11c formed through the lower plate 11 at positions overlapping the positions of the hole portions 1B in the stacking direction when the rotor core 1A is placed, and serving as air vent holes during resin injection described later.

[Details of Magnet Disposing Step]

Next, details of the magnet disposing step S2 will be described with reference to FIG. 3. As shown in FIG. 3, the rotor core 1A placed on the lower plate 11 of the holding jig has the plurality of hole portions 1B formed by stacking the holes 1b of the stacked steel sheets 1a. The magnets 1M are inserted and disposed in the respective hole portions 1B. The rotor core 1A shown in FIG. 3 is described as a rotor core in which the magnets 1M are disposed with their longitudinal directions corresponding to the circumferential direction. In the present embodiment, as shown in FIG. 11C, it is assumed that the longitudinal direction of the magnet 1M is inclined with respect to the circumferential direction and two magnets 1M are disposed so as to form a V shape when viewed from above. In general, the magnet is demagnetized when heated. Therefore, the magnet 1M at this stage is a magnet material before magnetization.

[Details of Jig Attaching Step]

Next, details of the jig attaching step S3 will be described with reference to FIG. 4. First, the structure of the holding jig 10 will be described.

Figure 4:
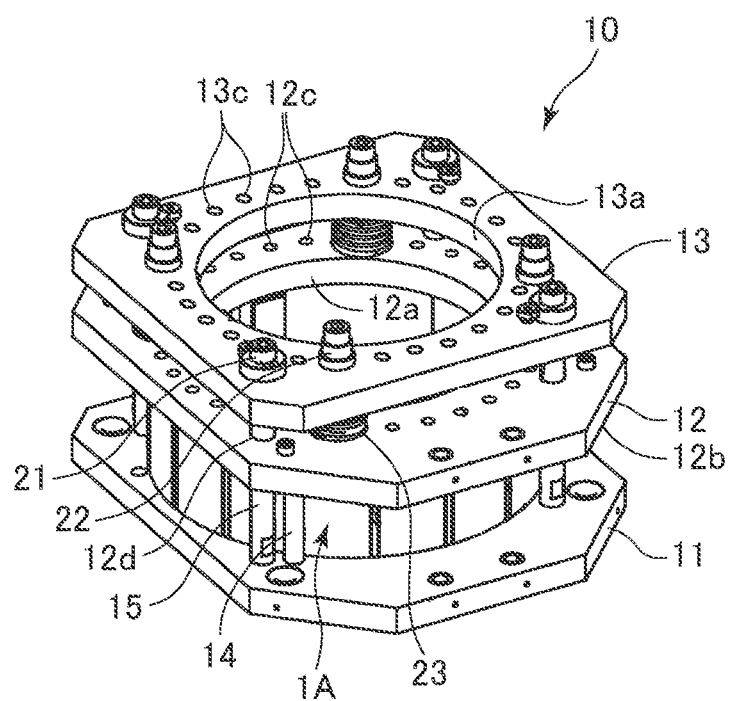
FIG. 4 is a perspective view showing a state in which the holding jig is attached to the rotor core.

As shown in FIG. 4, the holding jig 10 is broadly provided such that the lower plate 11, a pressing plate 12, and an upper plate 13 are sequentially disposed substantially in parallel in a vertical direction. The rotor core 1A is placed on the upper surface 11b of the lower plate 11 as described above, and the pressing plate 12 is placed above the rotor core 1A so that a lower surface 12b of the pressing plate 12 abuts against the rotor core 1A. The pressing plate 12 is a hollow plate-shaped member having a hole 12a formed at the center. As detailed later, a plurality of injection holes 12c for injecting a resin is formed through the pressing plate 12 so as to be positioned above the hole portions 1B of the rotor core 1A. The pressing plate 12 has a plurality of through holes 12d through which the second shafts 15 described above can pass.

The upper plate 13 is a hollow plate-shaped member having a hole 13a formed at the center, and is fastened to the upper ends of the second shafts 15 with bolts 21. Coil springs 23 are compressed between the pressing plate 12 and the upper plate 13. A support shaft (not shown) is disposed on an inner side of each coil spring 23 and fixed to the upper plate 13 with a bolt 22, thereby positioning and supporting the coil spring 23. In the holding jig 10 structured as described above, the rotor core 1A is held under pressure between the lower plate 11 and the pressing plate 12 pressed by the coil springs 23 from the upper plate 13. As a result, the plurality of stacked steel sheets 1a of the rotor core 1A is pressed in the stacking direction and held in contact with each other with as small a gap as possible in the stacking direction. The upper ends of the first shafts 14 are formed so as to face the lower surface of the pressing plate 12. The pressing plate 12 abuts against the upper ends while being pressed downward by the coil springs 23 so as not to crush the rotor core 1A in the stacking direction.

When the holding jig 10 structured as described above is attached to the rotor core 1A in the jig attaching step S3, the rotor core 1A is placed on the upper surface 11b of the lower plate 11, the pressing plate 12 is placed above the rotor core 1A with the second shafts 15 passing through the through holes 15d, the upper plate 13 is placed with the coil springs 23 interposed between the upper plate 13 and the pressing plate 12, and the second shafts 15 and the upper plate 13 are fastened with the bolts 21. As a result, the holding jig 10 that holds the rotor core 1A while pressing it in the stacking direction is attached to the rotor core 1A.

[Details of Heating Step]

Next, details of the heating step S4 will be described. In the present embodiment, the resin for fixing the magnets 1M in the hole portions 1B of the rotor core 1A is, for example, a thermosetting resin material that has a melting start temperature of 60° C., and a curing start temperature of 120° C., and is solid at room temperature. When the temperature of the rotor core 1A is lower than the melting start temperature, the resin may be solidified during the resin injection in the resin injection step S6 described later. Therefore, the hole portions 1B may be filled with the resin insufficiently. Thus, the temperature of the rotor core 1A needs to be equal to or higher than the melting start temperature when the resin is injected. In the present embodiment, when the resin is injected into the hole portion 1B, the resin may leak from a small gap between the stacked steel sheets 1a. By setting the temperature of the rotor core 1A to be equal to or higher than the curing start temperature when the resin is injected, curing is started from the resin in contact with the hole portion 1B. Thus, it is possible to prevent the resin from leaking between the stacked steel sheets 1a.

From the above background, in the heating step S4, the rotor core 1A held by the holding jig 10 (to which the holding jig 10 is attached) is put into a heating device such as a high-frequency heater together with the holding jig 10 to heat the rotor core 1A to the melting start temperature of the resin or higher, preferably the curing start temperature or higher. In the present embodiment, the rotor core 1A is heated to, for example, about 150° C. in the heating step S4.

[Details of Injection Apparatus Placement Step]

Next, details of the injection apparatus placement step S5 for placing the rotor core 1A held by the holding jig 10 on the resin injection apparatus 30 for injecting the resin will be described with reference to FIGS. 5, 6, 7, 8, and 10. First, description will be given of the structure of the resin injection apparatus 30 serving as a rotor manufacturing apparatus for manufacturing a rotor.

Figure 6:
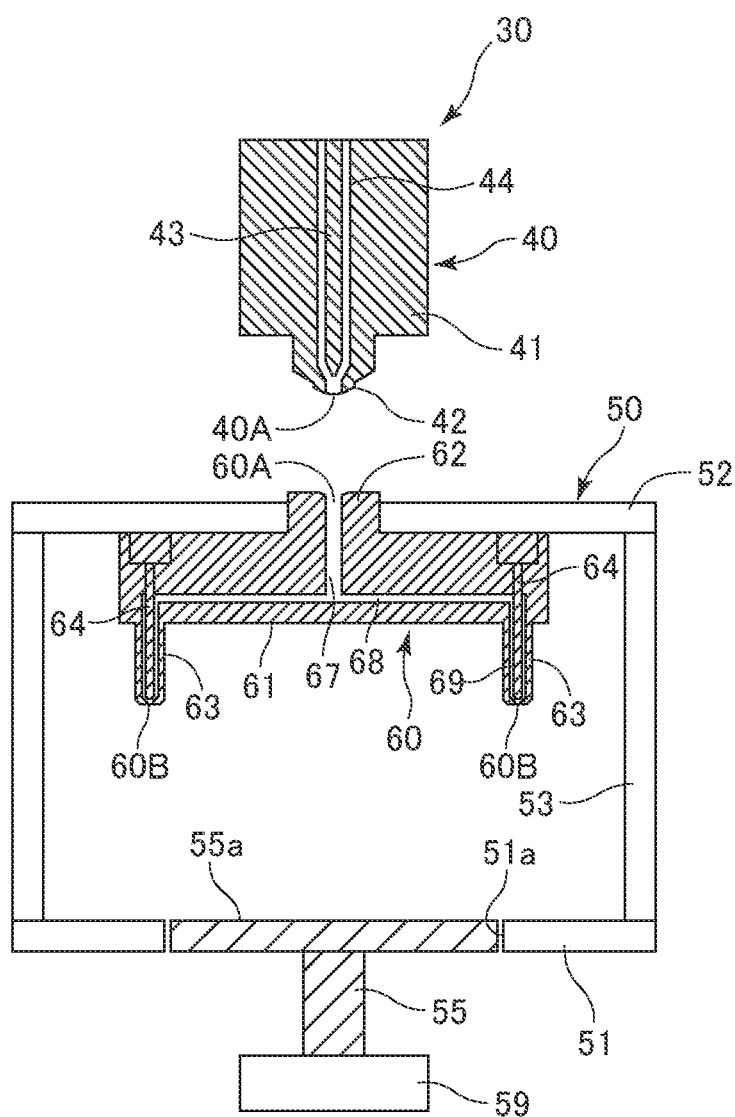
FIG. 6 is a sectional view showing a state in which an injection nozzle is attached to the rotor placement portion in the injection apparatus.
Figure 8:
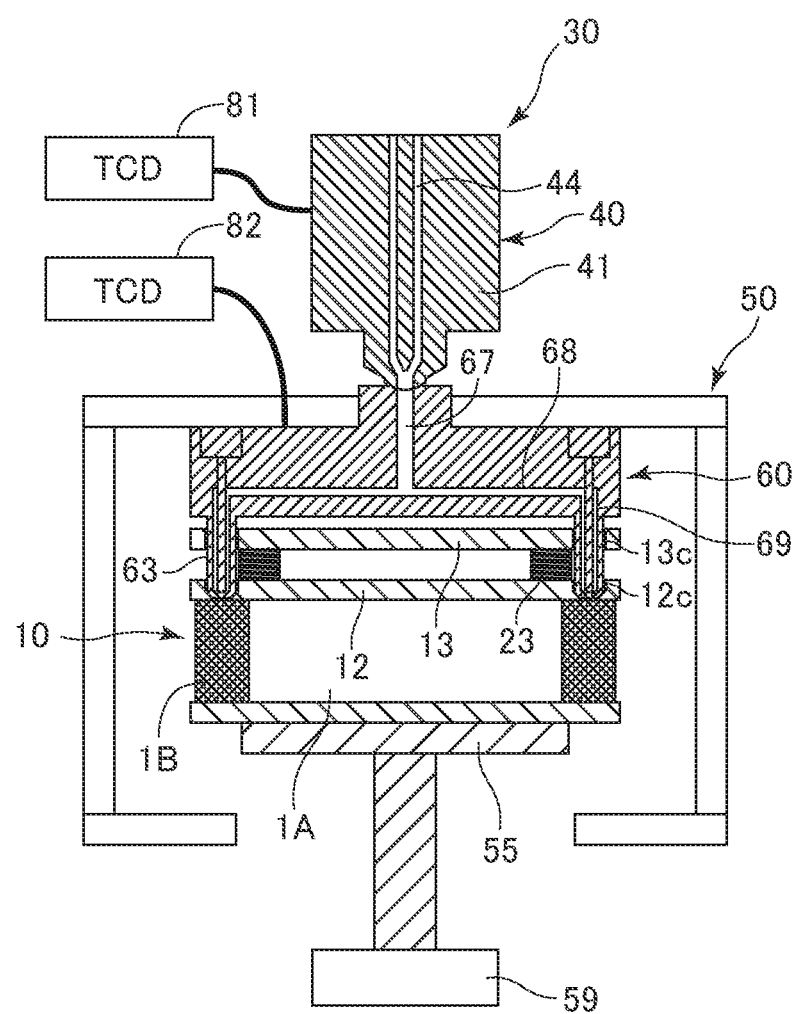
FIG. 8 is a sectional view showing a state in which the injection apparatus injects a resin into the rotor core.
Figure 10:
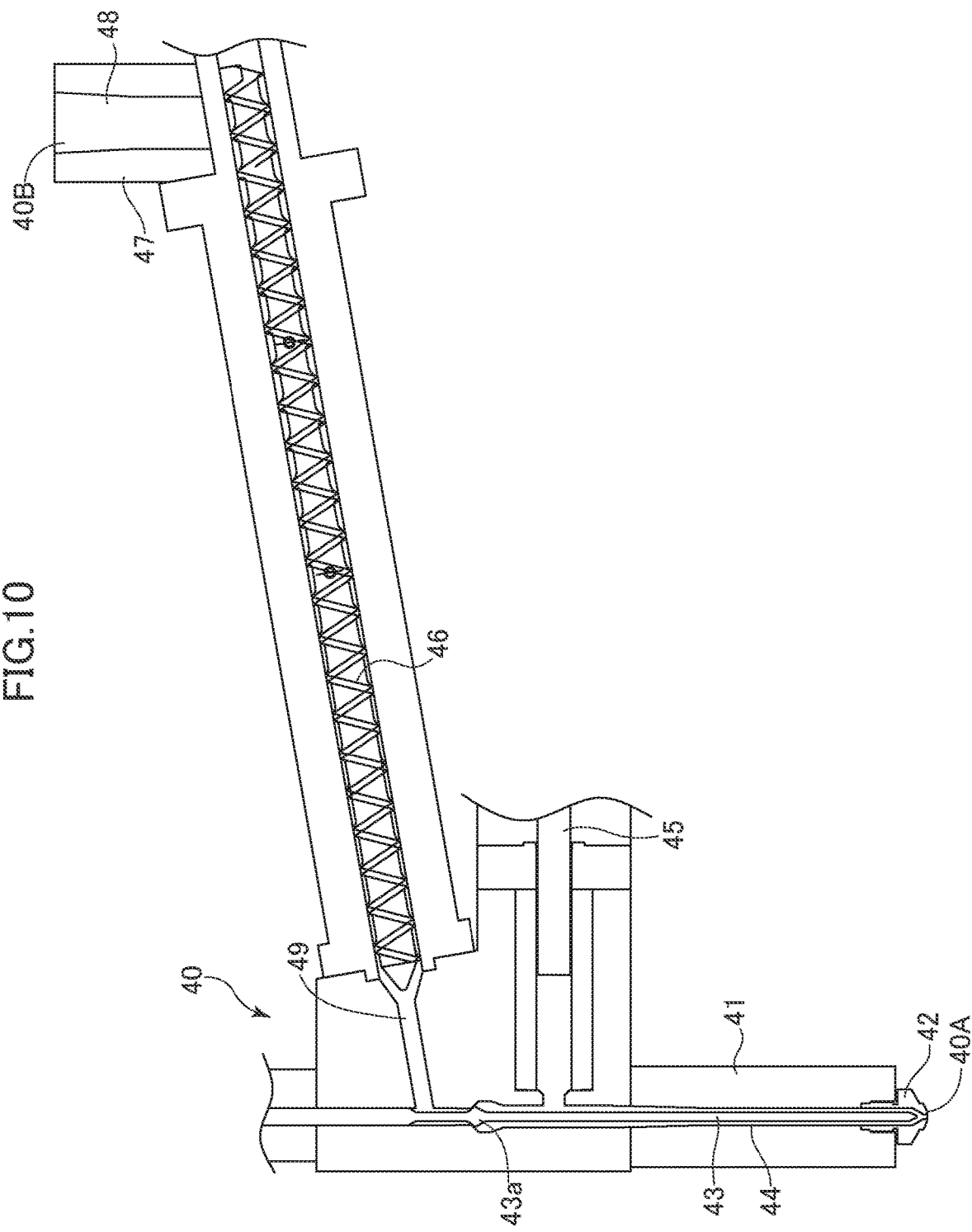
FIG. 10 is a sectional view showing the injector in the injection apparatus.

As shown in FIG. 6, the resin injection apparatus 30 includes, in a narrow sense, a resin injector 40 and a table portion 50 serving as a placement portion on which the rotor core 1A is placed. A runner 60 is disposed in the table portion 50 to structure, in a broad sense, the resin injection apparatus 30 for injecting the resin into the rotor core 1A. As shown in FIG. 10, the resin injector 40 includes a charging portion 47 having a resin charging hole 48 whose upper end serves as a resin material charging port 40B for charging a solid resin, a screw 46 for sending the resin charged from the resin material charging port 40B to a channel 49 while melting and agitating the resin, a tubular portion 41 having a channel 44 that communicates with the channel 49, a nozzle portion 42 fixed to the lower end of the tubular portion 41 and having an ejection port 40A at the lower end to serve as a first ejection port for ejecting the resin, a stop valve 43 serving as a first valve that passes or blocks the resin flow from the channel 49 to the channel 44 by an on-off valve 43a, and a plunger 45 for ejecting the resin in the channel 44 from the ejection port 40A. As shown in FIG. 8, a temperature control device 81 (Temp Control Device) serving as a first temperature control device capable of heating or cooling by, for example, a heating wire or coolant supply is attached to the resin injector 40. The temperature control device 81 controls the temperature of the resin at, for example, about 80° C. equal to or higher than the melting start temperature and lower than the curing start temperature to keep the molten state of the resin between the resin material charging port 40B and the ejection port 40A. In particular, the temperature control device 81 heats the screw 46 to melt the resin that has been charged into the resin material charging port 40B and is solid at room temperature and keep the molten state of the resin.

As shown in FIG. 6, the table portion 50 includes a lower plate 51 disposed on a lower side, side walls 53 fixed to the side ends of the lower plate 51, and an upper plate 52 supported by the side walls 53, disposed in parallel above the lower plate 51 to face the lower plate 51, and serving as a support portion for supporting the runner 60. A hole 51a is formed in the central portion of the lower plate 51. The table portion 50 includes a placement table 55 formed in conformity to the shape of the hole 51a and having an upper surface 55a serving as a table on which the lower plate 11 of the holding jig 10 is placed, and a driving device 59 serving as a driving unit for controlling the placement table 55 to ascend or descend and to rotate. Although illustration is omitted, the upper surface 55a of the placement table 55 has a projection, and the lower surface of the lower plate 11 of the holding jig 10 has a recess. By fitting the projection and the recess when the holding jig 10 is placed on the placement table 55, the position of the holding jig 10 relative to the placement table 55 is regulated in the rotating direction, that is, the positions of the holding jig 10 and the rotor core 1A in the rotating direction are controlled by the rotation of the placement table 55.

Figure 5:
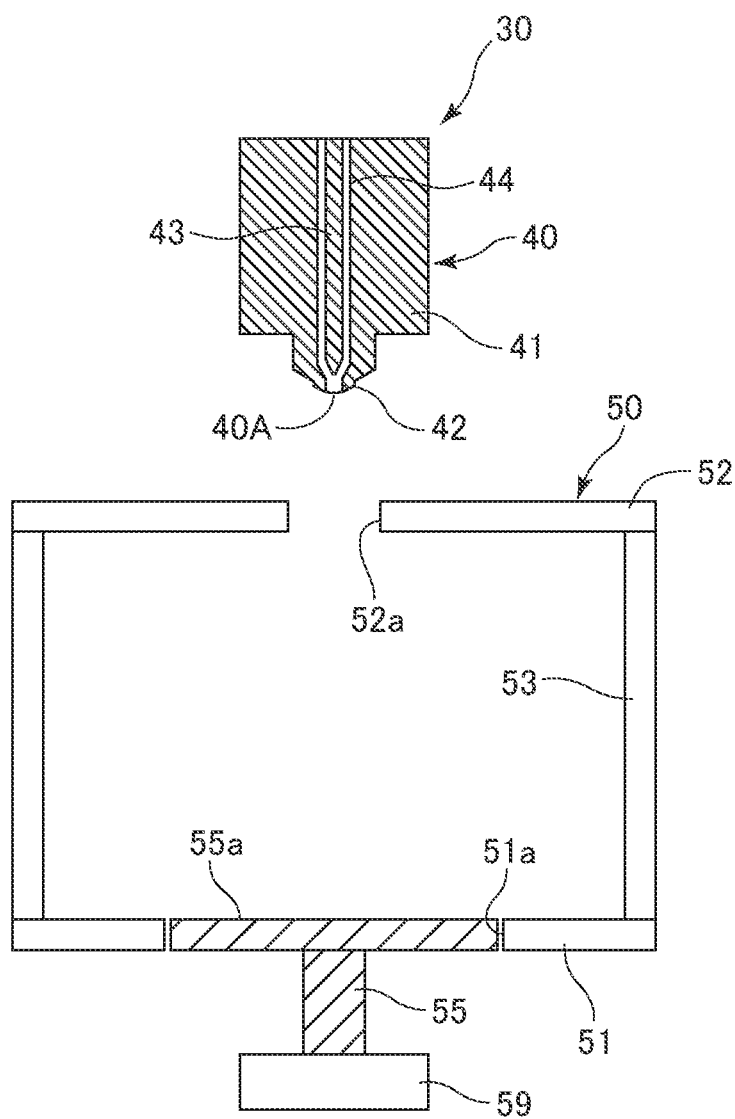
FIG. 5 is a sectional view showing a state in which an injector is separated from a rotor placement portion in an injection apparatus.

As shown in FIG. 5, an attachment hole 52a is formed in the upper plate 52 of the table portion 50. The runner 60 is detachably attached by fitting an upper shaft portion 62 of the runner 60 to the attachment hole 52a. The runner 60 broadly includes a charging port 60A fitted to the ejection port 40A of the resin injector 40, and a plurality of ejection ports 60B formed in branch nozzles 63 to branch and eject the resin charged from the charging port 60A. Details of the structure of the runner 60 will be described later.

Figure 7:
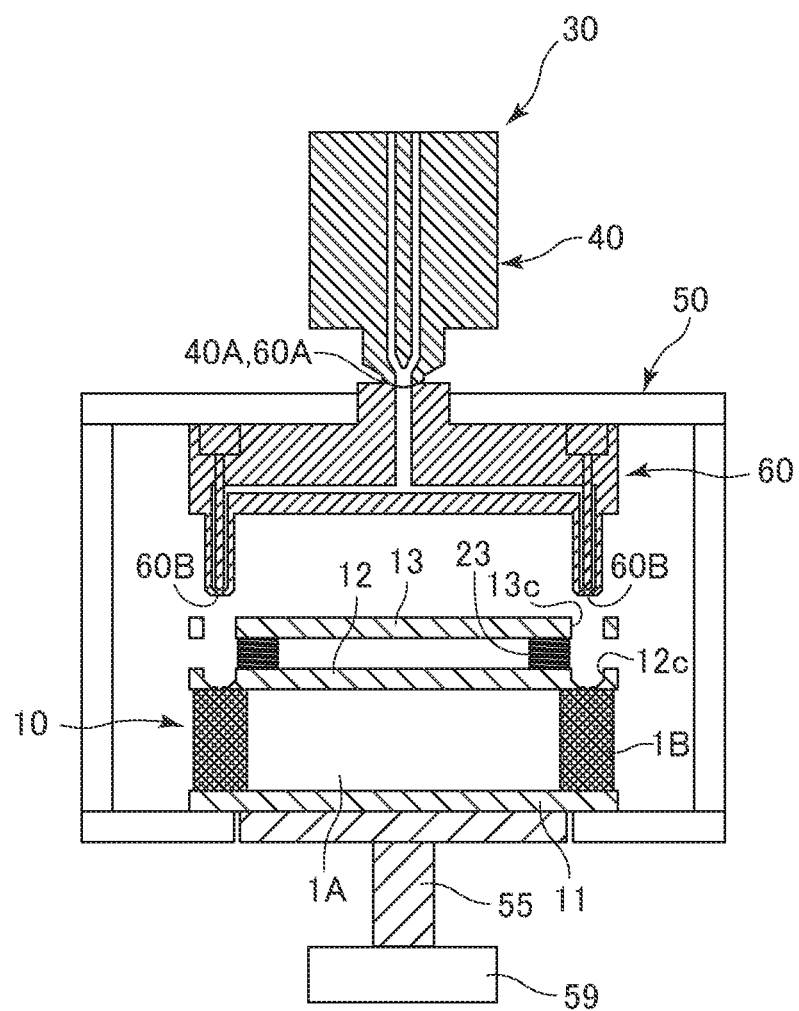
FIG. 7 is a sectional view showing a state in which the rotor core is placed on the rotor placement portion in the injection apparatus.

In the injection apparatus placement step S5 for placing the rotor core 1A to which the holding jig 10 is attached on the resin injection apparatus 30 structured as described above, the resin injector 40 is first separated from the table portion 50 as shown in FIG. 5, and the runner 60 is attached to the upper plate 52 by fitting the upper shaft portion 62 of the runner 60 detailed later to the attachment hole 52a of the upper plate 52 as shown in FIG. 6 in a state in which the placement table 55 descends with the upper surface 55a flush with the lower plate 51. In this state, the rotor core 1A to which the holding jig 10 is attached is placed on the placement table 55 as shown in FIG. 7. At this time, the rotor core 1A is fixed so as to be immovable in the rotating direction by fitting the projection (not shown) provided to the upper surface 55a of the placement table 55 to the recess (not shown) provided to the lower plate 11 of the holding jig 10 as described above. As shown in FIG. 8, the placement table 55 is caused to ascend by the driving device 59, the branch nozzles 63 having the ejection ports 60B detailed later are inserted into the through holes 13c of the upper plate 13 and the injection holes 12c of the pressing plate 12 that are formed in the holding jig 10, and the tips of the branch nozzles 63 are set in pressure contact with the injection holes 12c. Thus, the rotor core 1A is placed on the resin injection apparatus 30.

[Resin Injection Step]

Next, details of the resin injection step S6 will be described with reference to FIGS. 8, 12A, 12B, and 12C. First, description will be given of a positional relationship between the injection hole 12c of the pressing plate 12 of the holding jig 10 and the hole portion 1B of the rotor core 1A and the shape of the injection hole 12c. FIG. 12B shows a cross section viewed along arrows A-A in FIG. 12A. FIG. 12C shows a state in which the holding jig 10 is detached from the rotor core 1A at the same position as that in FIG. 12B.

Figure 12A:
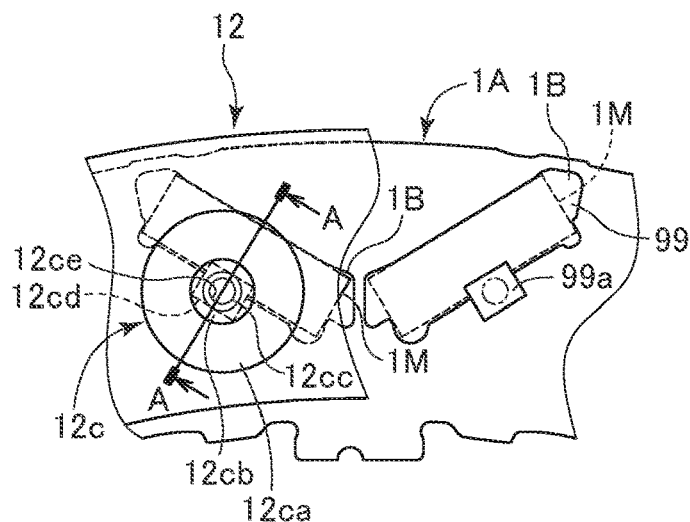
FIG. 12A is an enlarged top view showing a positional relationship between a hole portion of the rotor core and each of a nozzle and a gate of the injection nozzle, and a state of the injected resin.
Figure 12B:
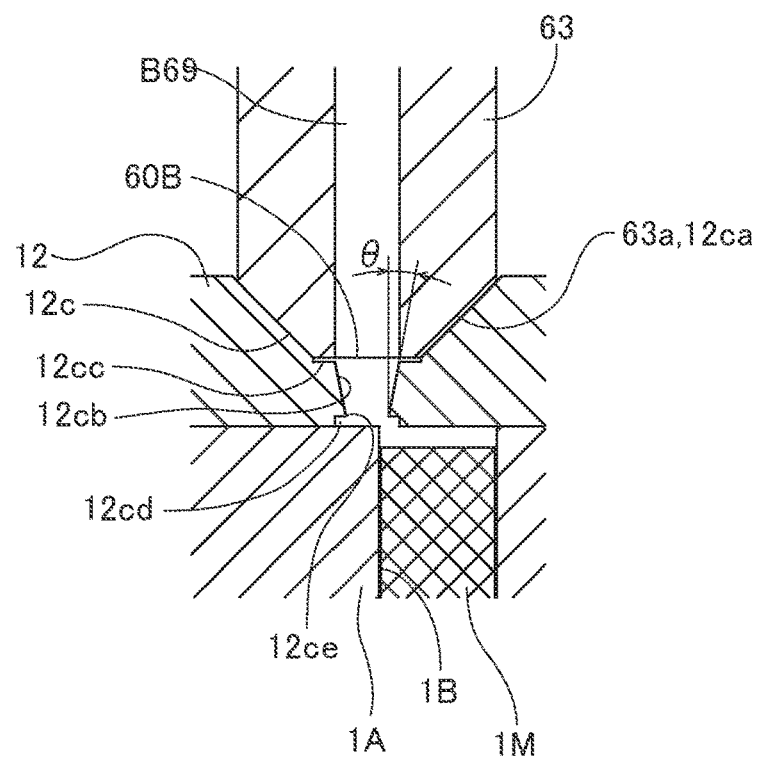
FIG. 12B is an enlarged sectional view showing the hole portion of the rotor core and the nozzle and the gate of the injection nozzle.
Figure 12C:
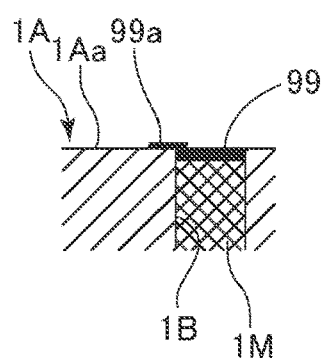
FIG. 12C is an enlarged sectional view showing the rotor core and the state of the resin after resin injection.

In the state in which the holding jig 10 is attached to the rotor core 1A, the injection hole 12c of the pressing plate 12 is positioned to at least partially overlap the hole portion 1B of the rotor core 1A as shown in FIG. 12A. Specifically, the center of the injection hole 12c is positioned on a radially inner side of the rotor core 1A with respect to the hole portion 1B. When the resin is injected into the hole portion 1B, the magnet 1M is pressed to an outer peripheral side by the pressure of the resin. As a result, the magnet 1M is brought closer to a radially outer side of the rotor core 1A. That is, when the rotor core 1A is attached to the stator as the rotary electric machine, the magnet 1M is brought as close to the stator as possible, thereby increasing the magnetic force and improving the output and efficiency of the rotary electric machine.

As shown in FIG. 12B, the injection hole 12c of the pressing plate 12 of the holding jig 10 includes a first inclined surface 12ca that has an inclined shape gradually decreasing in bore diameter so that a conical inclined surface 63a at the tip of the branch nozzle 63 of the runner 60 can be fitted in pressure contact, and that is sealed when fitted, a second inclined surface 12cb that is disposed below the first inclined surface 12ca (close to the rotor core 1A) and has a tapered shape with decreasing bore diameter toward the rotor core 1A in a penetrating direction of the injection hole 12c by being inclined at an acute angle θ with respect to the center of the injection hole 12c, a step portion 12cc that is formed between the first inclined surface 12ca and the second inclined surface 12cb and prevents the branch nozzle 63 from entering the second inclined surface 12cb, a small-diameter portion 12ce that is formed at the lower tip of the second inclined surface 12cb and functions as a throttle portion with the smallest bore diameter, and an enlarged opening portion 12cd that is wider than the small-diameter portion 12ce in the horizontal direction (direction orthogonal to the penetrating direction) below the small-diameter portion 12ce and serves as an opening portion of the injection hole 12c.

In the present embodiment, the angle θ of the second inclined surface 12cb is set to, for example, 30°, but may be any acute angle, that is, may be larger than 0° and smaller than 45°. In the present embodiment, as shown in FIG. 12A, the enlarged opening portion 12cd has a rectangular shape that extends in the horizontal direction at a position including the small-diameter portion 12ce when viewed in the vertical direction, but is not limited to this shape, and may have any shape such as a circular shape, an elliptical shape, or an oblong shape in sectional view as long as the sectional area in the horizontal direction is larger than that of the small-diameter portion 12ce. The enlarged opening portion 12cd is positioned across an upper surface 1Aa and the hole portion 1B of the rotor core 1A in a state in which the pressing plate 12 abuts against the upper surface 1Aa of the rotor core 1A. The small-diameter portion 12ce has a diameter of, for example, about 1 mm to 5 mm, and the enlarged opening portion 12cd has a vertical thickness of, for example, about 0.5 mm.

In the resin injection step S6 for injecting the resin into the hole portion 1B of the rotor core 1A from the injection hole 12c of the pressing plate 12 of the holding jig 10 structured as described above, as shown in FIG. 8, in the resin injector 40 of the resin injection apparatus 30, the stop valve 43 is opened and the resin in the channel 44 is pressed by the plunger 45 (see FIG. 10). Therefore, the resin is ejected from the ejection port 40A into the charging port 60A of the runner 60, and is ejected into each hole portion 1B from each ejection port 60B of the runner 60. Thus, the resin fills the periphery of the magnet 1M while pressing the magnet 1M toward the radially outer side of the rotor core 1A.

At this time, air inside the hole portion 1B escapes from the air hole 11c of the lower plate 11 of the holding jig 10, and the resin fills the hole portion 1B without a gap. Since the rotor core 1A is heated to a temperature higher than the curing start temperature of the resin as described above, the resin filling the hole portion 1B starts to be cured from a portion in contact with the side surface of the hole portion 1B, thereby preventing the resin from leaking from the gap between the stacked steel sheets 1a. As shown in FIG. 12C, a filling resin 99 fills the hole portion 1B up to its opening, and further fills the enlarged opening portion 12cd while causing air to slightly escape into the enlarged opening portion 12cd. A rectangular plate-shaped resin plate portion 99a is formed across the hole portion 1B and the upper surface 1Aa of the rotor core 1A. The function of the plate portion 99a will be described later in detail in the jig detaching step S8.

[Details of Magnet Fixing Step]

Figure 9:
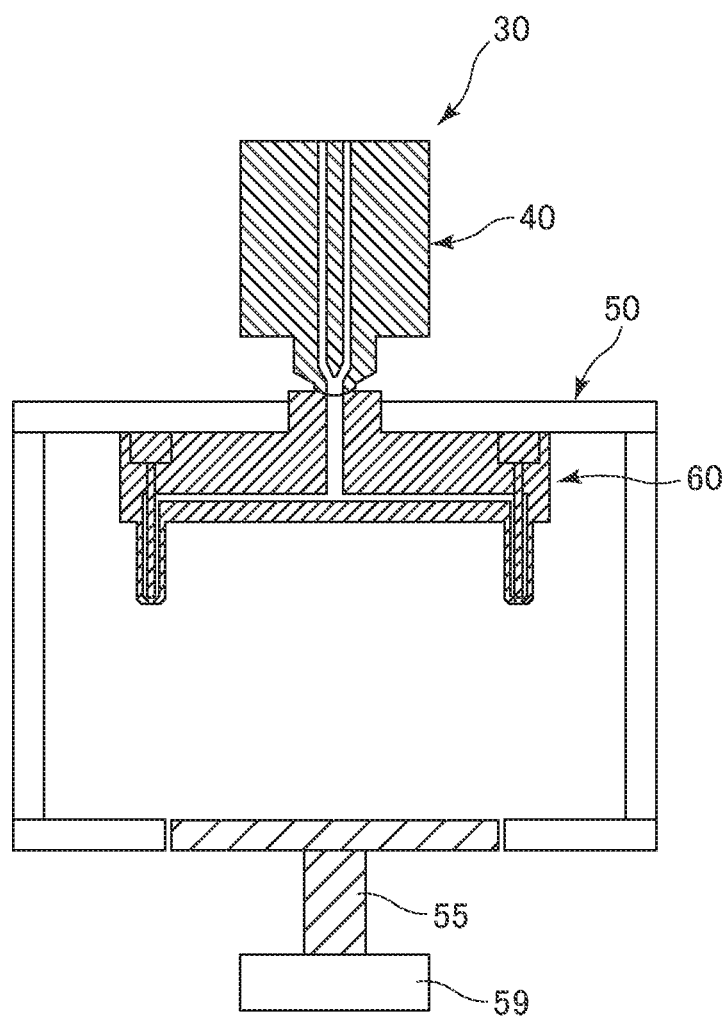
FIG. 9 is a sectional view showing a state in which the rotor core into which the injection apparatus has injected the resin is detached from the rotor placement portion.

Next, details of the magnet fixing step S7 will be described. When the resin injection step S6 is finished, as shown in FIG. 9, the rotor core 1A to which the holding jig 10 is attached is detached from the placement table 55 of the resin injection apparatus 30. That is, the rotor core 1A is taken out from the resin injection apparatus 30. In this state, the rotor core 1A is heated by a heating device (not shown) with the holding jig 10 attached so as to keep the temperature of the rotor core 1A at, for example, about 150° C. equal to or higher than the curing start temperature of the resin. That is, the resin filling the hole portion 1B of the rotor core 1A starts to be cured from the portion in contact with the rotor core 1A during the injection as described above, but there is a portion that is not completely cured inside the hole portion 1B. Therefore, in the magnet fixing step S7, the heated state is kept and the temperature of the resin in the hole portion 1B is kept at the curing start temperature or higher for a predetermined period until the resin is completely cured. As a result, the magnet 1M is completely fixed to the hole portion 1B of the rotor core 1A by the resin. In the present embodiment, description is given of the case where the rotor core 1A is heated by the heating device to the temperature of, for example, about 150° C. in the magnet fixing step S7. The rotor core 1A may be heated to a higher temperature (for example, about 170° C.) to accelerate the resin curing.

When the resin curing is completed in the magnet fixing step S7 as described above, the rotor core 1A is completed as the rotor 1. Then, a rotor shaft and the like are attached to the rotor 1 to form a rotor with a shaft, which constitutes a broadly defined rotor as a component of the rotary electric machine.

In the present embodiment, the heating step S4 and the magnet fixing step S7 are separately described. As described above, the heating of the rotor core 1A is started in the heating step S4, and the temperature of the rotor core 1A is kept at the curing start temperature of the resin or higher until the magnet fixing step S7. Therefore, the heating step in a broad sense continues up to the heating step S4, the injection apparatus placement step S5, the resin injection step S6, and the magnet fixing step S7. In other words, the heating step S4 is also the step of fixing the magnets 1M to the rotor core 1A because the heating is performed to cure the resin even before the resin is injected.

[Details of Jig Detaching Step]

Next, details of the jig detaching step S8 will be described. When the magnets 1M are completely fixed to the hole portions 1B of the rotor core 1A by curing the resin in the magnet fixing step S7, the holding jig 10 is detached from the rotor core 1A (rotor 1). That is, the holding jig 10 is detached from the rotor core 1A in the order opposite to the order of attachment of the holding jig 10 to the rotor core 1A in the jig attaching step S3. Specifically, the bolts 21 shown in FIG. 4 are unfastened to detach the upper plate 13 and the coil springs 23. Then, the pressing plate 12 is detached from the lower plate 11 by being pulled out from the second shafts 15 to achieve the state shown in FIG. 3. Lastly, the rotor core 1A is taken out from the lower plate 11 upward. Thus, the jig detaching step S8 is finished.

Figure 13A:
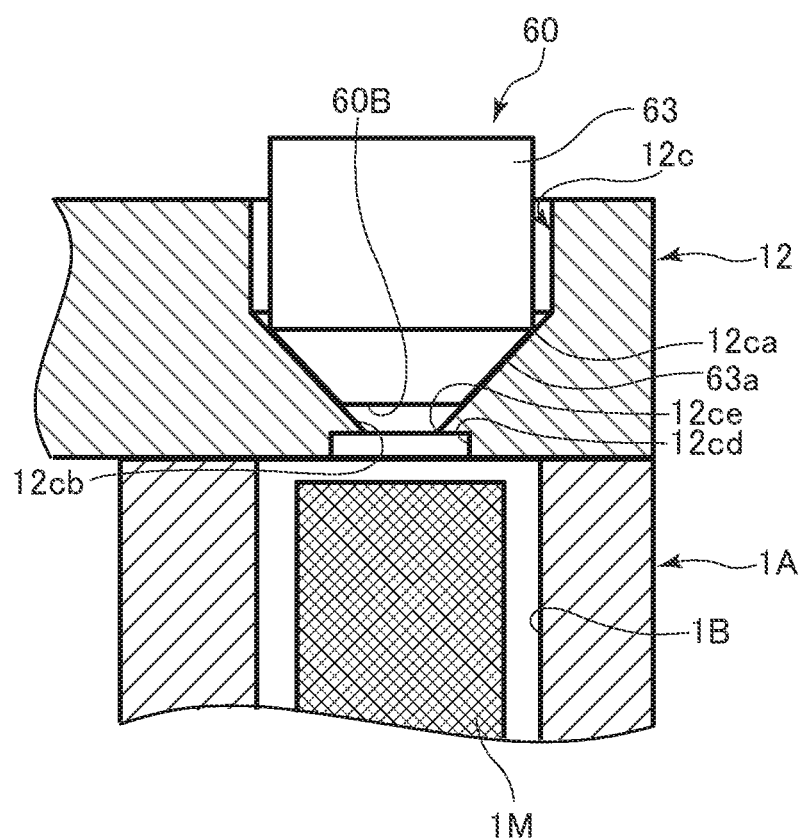
FIG. 13A is a schematic sectional view illustrating the shapes of and the positional relationship between the hole portion of the rotor core and each of the nozzle and the gate of the injection nozzle.
Figure 13B:
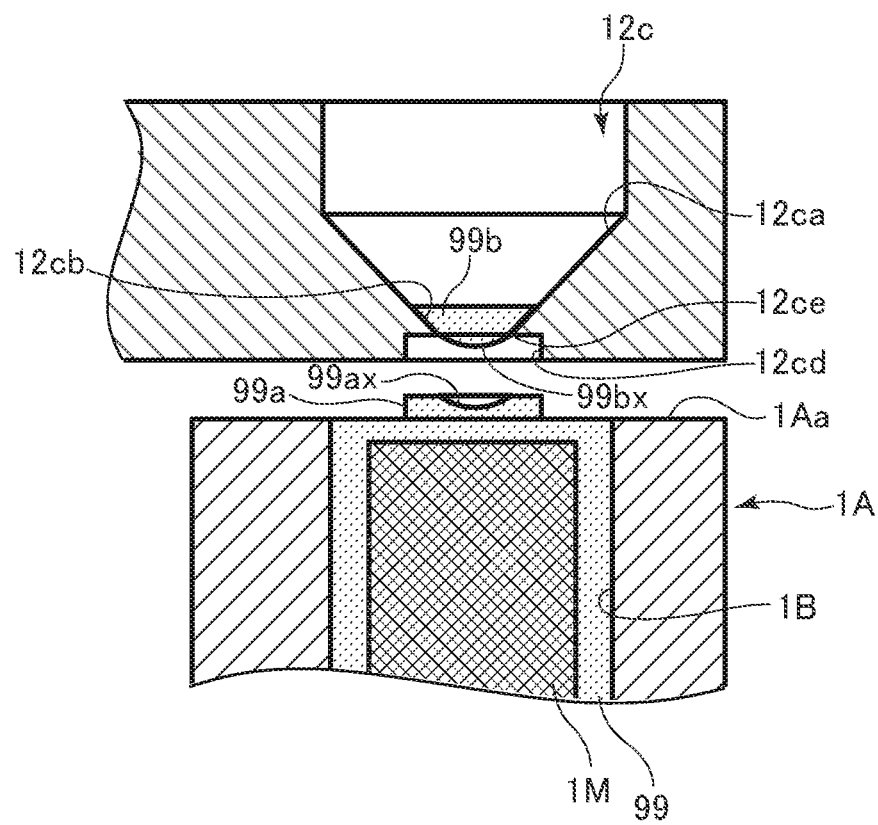
FIG. 13B is a schematic sectional view illustrating separation of the resin at the gate after the resin injection.

Separation of the resin at the injection hole 12c of the pressing plate 12 of the holding jig 10 will be described with reference to FIGS. 13A and 13B. FIGS. 13A and 13B are schematic diagrams for facilitating the description. The detailed shape of the injection hole 12c is more exactly shown in FIG. 12B.

In general, when a nozzle is moved away after a resin is ejected from the nozzle, the uncured resin may extend like a thread to form a so-called burr. In order that the burr does not come into contact with the surrounding components inside the rotary electric machine or does not fall into the rotary electric machine, it is necessary to perform a deburring process for cleanly removing the burr. However, such a deburring process requires dedicated equipment. Further, it is difficult to automate the deburring process. Therefore, it is necessary to assign an operator. Thus, the cost may increase. In view of this, the present embodiment has a feature in the shape of the injection hole 12c so that the deburring process becomes unnecessary.

In the resin injection step S6 described above, the resin is injected into the hole portion 1B of the rotor core 1A in a state in which the branch nozzle 63 of the runner 60 is inserted in pressure contact with the injection hole 12c of the pressing plate 12 as shown in FIG. 13A. At this time, the branch nozzle 63 does not enter the second inclined surface 12cb due to the step portion 12cc. Therefore, the ejection port 60B is positioned on the second inclined surface 12cb side in the penetrating direction with respect to the small-diameter portion 12ce of the injection hole 12c. The resin 99 particularly fills portions located below the ejection port 60B of the branch nozzle 63 and surrounded by the second inclined surface 12cb and by the enlarged opening portion 12cd to form, as shown in FIG. 13B, the plate portion 99a (see FIG. 12C) by the enlarged opening portion 12cd and a conical portion 99b having a conical shape by the second inclined surface 12cb so as to be connected to the plate portion 99a. At this time, a narrow constriction is formed in the horizontal direction between the resin plate portion 99a and the conical portion 99b due to the small-diameter portion 12ce. Although the ejection port 60B is located at the end of the first inclined surface 12ca in the present embodiment, it may enter the second inclined surface 12cb halfway.

If the pressing plate 12 is separated from the rotor core 1A when the pressing plate 12 is detached from the upper surface 1Aa of the rotor core 1A in the jig detaching step S8, the second inclined surface 12cb pulls the conical portion 99b upward while grabbing it. Thus, it is possible to break the conical portion 99b by concentrating a shear stress on the constricted part having low rigidity. When the pressing plate 12 is pulled upward, the conical portion 99b pulls the plate portion 99a. As shown in FIG. 12A, the plate portion 99a is formed across the hole portion 1B and the upper surface 1Aa of the rotor core 1A so as to adhere to the rotor core 1A in an area equal to or larger than the sectional area of the small-diameter portion 12ce. Therefore, the majority of the tensile stress is received by the upper surface 1Aa of the rotor core 1A. Thus, it is possible to prevent influence on the positional accuracy of the magnet 1M by pulling the magnet 1M via the resin 99 in the hole portion 1B. Regarding a broken portion 99bx of the conical portion 99b and a broken portion 99ax of the plate portion 99a shown in FIG. 13B, the broken portion 99ax is a recess and the broken portion 99bx is a projection. Depending on the temperature or the degree of tensile strength, the broken portion 99ax and the broken portion 99bx may be substantially smooth or the projection and recess may be reversed. When the branch nozzle 63 is separated from the injection hole 12c, the resin may extend like a thread from the ejection port 60B to form a burr. The burr is formed at an upper part of the conical portion 99b and the conical portion 99b is finally discarded. Therefore, even if the burr is formed at that part, the burr does not remain on the rotor core 1A.

As described above, when the pressing plate 12 of the holding jig 10 is detached from the rotor core 1A in the jig detaching step S8, the conical portion 99b can cleanly be broken off the resin plate portion 99a. For example, the step for the deburring process can be made unnecessary. Since the holding jig 10 is detached before the cooling in the cooling step S9 described later, the separation between the lower plate 11 and the resin in the hole portion 1B of the rotor core 1A and between the pressing plate 12 and each of the resin plate portion 99a and the hole portion 1B can be performed in a high-temperature and uncooled state of the resin. That is, the separation can be performed before the adhesion is strengthened by the cooling of the resin. Therefore, the holding jig 10 can be detached easily. The conical portion 99b remaining in the injection hole 12c of the pressing plate 12 is removed and discarded by pushing it out with a pin or the like. Then, the components of the holding jig 10 including the air holes 11c of the lower plate 11 are cleaned with a brush or the like, and are used again for manufacturing the next rotor core 1A.

[Details of Cooling Step]

Lastly, details of the cooling step S9 will be described. After the holding jig 10 is detached from the rotor core 1A (rotor 1) in the jig detaching step S8 as described above, the rotor core 1A from which the holding jig 10 is detached and the holding jig 10 detached from the rotor core 1A are put into a cooling device together and individually cooled inside the cooling device. That is, when the holding jig 10 is attached to the rotor core 1A, the lower plate 11 and the pressing plate 12 are particularly in contact with and cover both the upper and lower surfaces of the rotor core 1A. By detaching the holding jig 10, the exposed surface area of the rotor core 1A is larger than that before the detachment. Thus, the cooling efficiency increases. Since the holding jig 10 also has a large heat capacity, the holding jig 10 and the rotor core 1A are not easily cooled due to the large heat capacity in the state in which the holding jig 10 is attached to the rotor core 1A. By separating the holding jig 10 and the rotor core 1A, the cooling efficiency increases because each heat capacity decreases. As a result, it is possible to shorten the cooling period of the rotor core 1A and to shorten the cooling period of the holding jig 10 as well.

[Detailed Structure of Runner]

Next, the detailed structure of the runner 60 will be described with reference to FIGS. 11A, 11B, and 11C. In the present embodiment, the runner 60 is structured in conformity to the shape of the rotor core 1A having 32 hole portions 1B. That is, the runner 60 is designed exclusively for use in the manufacture of the rotor 1. When manufacturing a rotor having another shape, the runner 60 is replaced with another runner having a shape conforming to a rotor core having another shape. The shape conforming to a rotor core having another shape means that the positions of the ejection ports 60B are changed depending on the number and disposition of the hole portions of the rotor core. The shape of the charging port 60A, the shape of the upper shaft portion 62 described later, and the like are substantially the same among all the runners so that they can be adapted to the resin injector 40 and the table portion 50 even when replaced.

Figure 11A:
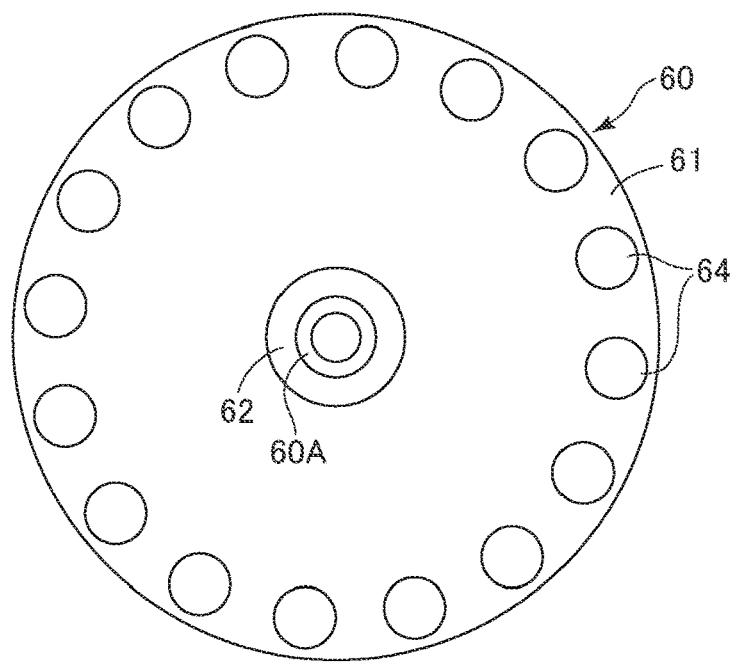
FIG. 11A is a top view showing the injection nozzle.
Figure 11B:
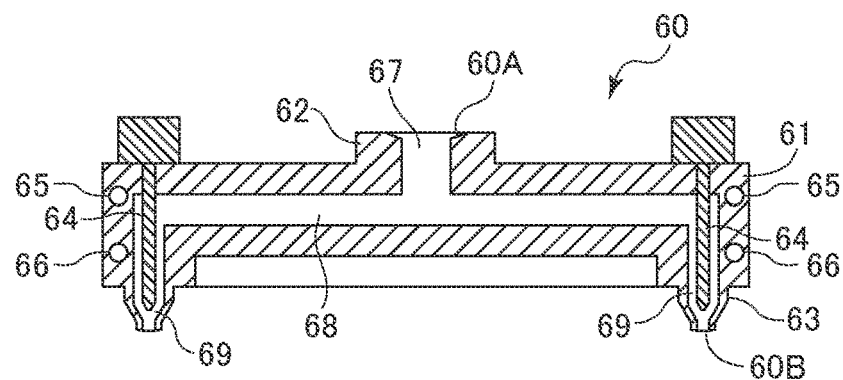
FIG. 11B is a sectional view showing the injection nozzle.
Figure 11C:
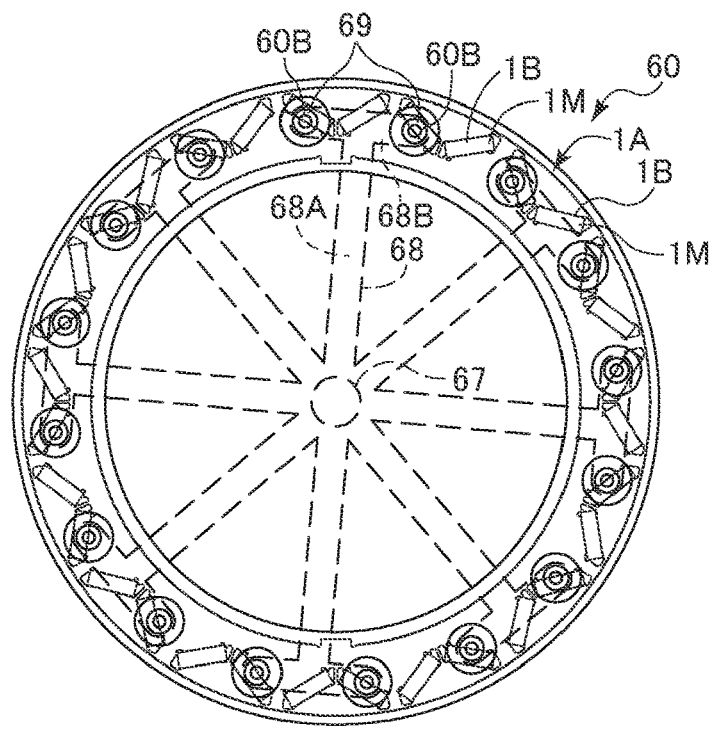
FIG. 11C is a top view showing a positional relationship between the rotor core and the injection nozzle.

As shown in FIGS. 11A and 11B, the runner 60 according to the present embodiment includes a disc-shaped body 61, the shaft-shaped upper shaft portion 62 extending upward from the center of the body 61, and the plurality of branch nozzles 63 extending downward from the lower outer periphery of the body 61. The upper shaft portion 62 is formed so as to be attachable to and detachable from the attachment hole 52a of the upper plate 52 of the table portion 50. In the present embodiment, the number of the branch nozzles 63 is half the number of the hole portions 1B of the rotor core 1A. That is, when the number of the hole portions 1B (that is, the magnets 1M) of the rotor core 1A is 32, the number of the branch nozzles 63 is 16. The reason is as follows. The number of the hole portions 1B of the rotor core 1A is as large as 32, the distance between the hole portions 1B is short, and the branch nozzles 63 having the ejection ports 60B require a certain thickness to withstand the resin pressure. Therefore, the ejection ports 60B cannot be brought close to each other. Thus, it is not possible to prepare as many ejection ports 60B as the hole portions 1B.

As shown in FIG. 11B, a charging channel 67 whose upper end serves as the resin charging port 60A is formed inside the runner 60 in the vertical direction along a central axis of the upper shaft portion 62 and the disc shape of the body 61. As shown in FIG. 11C, branch channels 68 that branch from the charging channel 67 toward the branch nozzles 63 are formed inside the body 61. The branch channels 68 include eight radiate channels 68A that radiately branch from the charging channel 67 in the horizontal direction orthogonal to the central axis, and circumferential channels 68B that each branch to both sides in the circumferential direction on the outer peripheral side of the radiate channel 68A. As shown in FIG. 11B, injection channels 69 are formed inside the body 61 and the branch nozzles 63 to extend downward from the circumferential ends of the circumferential channels 68B of the branch channels 68. The ejection ports 60B serving as second ejection ports are formed at the lower ends of the injection channels 69. A stop valve 64 serving as a second valve that opens or closes the ejection port 60B is provided inside each injection channel 69.

The runner 60 includes a heating wire 65 disposed so as to surround the runner 60 in the circumferential direction, and a coolant channel 66 similarly disposed so as to surround the runner 60 in the circumferential direction. The heating wire 65 and the coolant channel 66 are connected to a temperature control device 82 (Temp Control Device) serving as a second temperature control device shown in FIG. 8. Since the runner 60 is separated from the pressing plate 12 of the holding jig 10 and is influenced by the temperatures of the holding jig 10 and the rotor core 1A as thermal disturbance, the temperature control device 82 controls the temperature of the resin between the charging port 60A and the ejection ports 60B to keep the temperature at, for example, about 80° C. equal to or higher than the melting start temperature and lower than the curing start temperature by supplying a current to the heating wire 65 for heating or by supplying a coolant to the coolant channel 66 for cooling. As described above, the temperature control device 81 performs temperature control for melting the resin in the resin injector 40. The temperature control device 82 performs temperature control for dealing with a temperature change caused by the disturbance in the runner 60. That is, the temperature control can be performed independently.

[Details of Resin Injection Step]

Next, description will be given of the state of use of the runner 60 and the operation of the table portion 50 in the resin injection step S6. When the resin is ejected from the ejection port 40A of the resin injector 40 into the charging port 60A of the runner 60, the resin flows from the charging channel 67 of the runner 60 to branch into the eight radiate channels 68A, and further flows from the radiate channels 68A to the ejection ports 60B of the 16 branch nozzles 63 through the circumferential channels 68B. When the stop valves 64 are opened, the resin is ejected from the 16 ejection ports 60B into the injection holes 12c, and is injected from the injection holes 12c into the 16 hole portions 1B of the rotor core 1A.

When the eight hole portions 1B of the rotor core 1A have been filled with the resin, the rotor core 1A to which the holding jig 10 is attached is separated from the branch nozzles 63 by causing the placement table 55 to descend by the driving device 59 as shown in FIG. 7. Then, the placement table 55 is rotated by the driving device 59, and the phase is adjusted so that the branch nozzles 63 are positioned above the hole portions 1B that are not filled with the resin. The placement table 55 is caused to ascend to insert and set the branch nozzles 63 in the injection holes 12c where the resin is not injected. Then, the resin is injected similarly to the above to fill the remaining 16 hole portions 1B out of the 32 hole portions 1B. In the manner described above, the resin injection step S6 is finished. When the resin is ejected from the ejection ports 60B into the hole portions 1B of the rotor core 1A, the stop valves 64 are opened to eject the resin. When the injection is completed, the ejection ports 64B are closed by the stop valves 64. Thus, the resin ejection from the ejection ports 60B can be stopped.

At this time, the charging channel 67, the branch channels 68, and the plurality of injection channels 69 from the charging port 60A to the ejection ports 60B of the runner 60 are filled with the resin to be ejected next. The capacities of the charging channel 67, the branch channels 68, and the plurality of injection channels 69 are set so that the amount of resin filling the runner 60 is larger than the amount of resin that is ejected at one time from the plurality of injection channels 69 toward the hole portions 1B. As a result, the temperature control device 82 keeps the temperature of the resin inside the runner 60 at, for example, about 80° C. equal to or higher than the melting start temperature and lower than the curing start temperature until the next ejection is performed. Thus, the resin having an appropriate temperature can be ejected to the hole portions 1B of the rotor core 1A.

In the resin injection step S6, the ejection port 40A of the resin injector 40 remains fitted to the charging port 60A of the runner 60 as shown in FIG. 9 when the resin is injected successively into the next rotor core 1A, in other words, until the runner 60 is replaced to manufacture a rotor core having a different shape. That is, when replacing the runner 60, the ejection port 40A is separated from the charging port 60A by causing the resin injector 40 to ascend as shown in FIG. 6. In this state, the runner 60 is detached from the table portion 50 and the next runner 60 is disposed on the table portion 50. When the runner 60 is replaced in this manner, the stop valve 43 of the resin injector 40 can stop the resin ejection from the ejection port 40A, thereby preventing the resin leakage.

As described above, in the present embodiment, the rotor core 1A placed on the placement table 55 is moved relative to the runner 60. Therefore, there is no need to move the runner 60 and the resin injector 40 at least in the resin injection step S6. For example, the driving mechanism can be simplified, that is, the structure of the resin injector 40 can be simplified as compared with a case where the resin injector 40 is moved each time the resin is injected. Since the movement of the runner 60 and the resin injector 40 is unnecessary, there is no need to move the temperature control device 81 and the temperature control device 82 as well. Further, there is no need to move connection components such as a wire for supplying a current to the heating wire 65 and a pipe for sending the coolant to the coolant channel 66. Thus, the structures of these components can be simplified as well.

[Other Runner Structure]

Figure 14A:
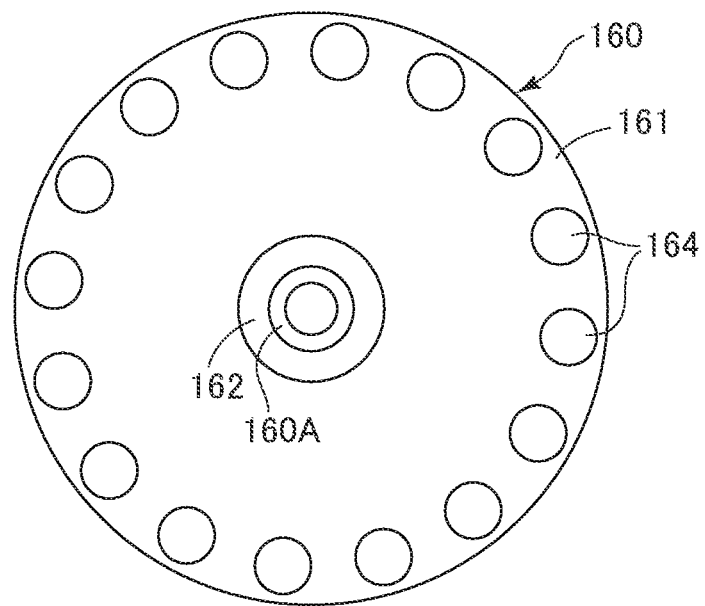
FIG. 14A is a top view showing another injection nozzle for replacement.
Figure 14B:
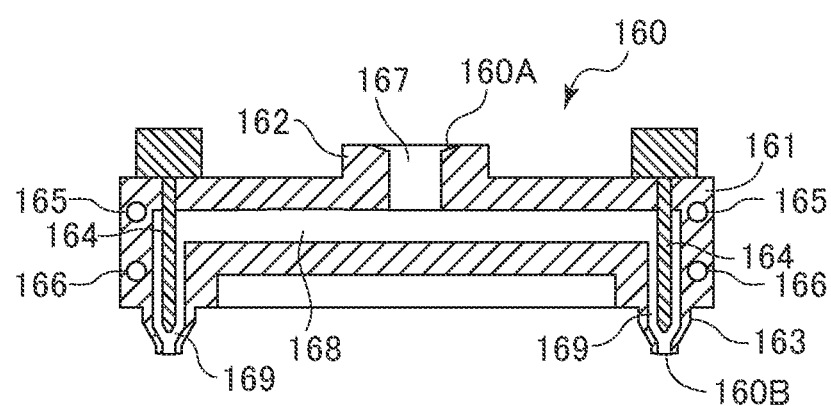
FIG. 14B is a sectional view showing the other injection nozzle for replacement.

Next, the structure of a runner 160 different from the runner 60 will be described. As shown in FIGS. 14A and 14B, the runner 160 has a smaller outside diameter than the runner 60. That is, the runner 160 is a runner for injecting a resin into a rotor core having a smaller diameter than the rotor core 1A in terms of the positions of the hole portions (that is, the outside diameter).

That is, similarly to the runner 60, the runner 160 includes a disc-shaped body 161, a shaft-shaped upper shaft portion 162 extending upward from the center of the body 161, a plurality of branch nozzles 163 extending downward from the lower outer periphery of the body 161, and a plurality of stop valves 164 disposed in the respective branch nozzles 163. Similarly, a charging channel 167 whose upper end serves as a resin charging port 160A is formed inside the runner 160 in the vertical direction along a central axis of the upper shaft portion 162 and the disc shape of the body 161. Branch channels 168 that branch from the charging channel 167 toward the branch nozzles 163 are formed inside the body 161. Injection channels 169 are formed to extend downward from the circumferential ends of the branch channels 168. Ejection ports 160B serving as the second ejection ports are formed at the lower ends of the injection channels 169. Similarly, the runner 160 includes a heating wire 165 disposed so as to surround the runner 160 in the circumferential direction, and a coolant channel 166 similarly disposed so as to surround the runner 160 in the circumferential direction. The runner 160 is structured such that, when the center of the charging channel 167 in the axial direction is defined as a central axis, the radius from the charging port 160A to the ejection port 160B is different from, that is, smaller than the radius from the charging port 60A to the ejection port 60B of the runner 60.

Figure 15:
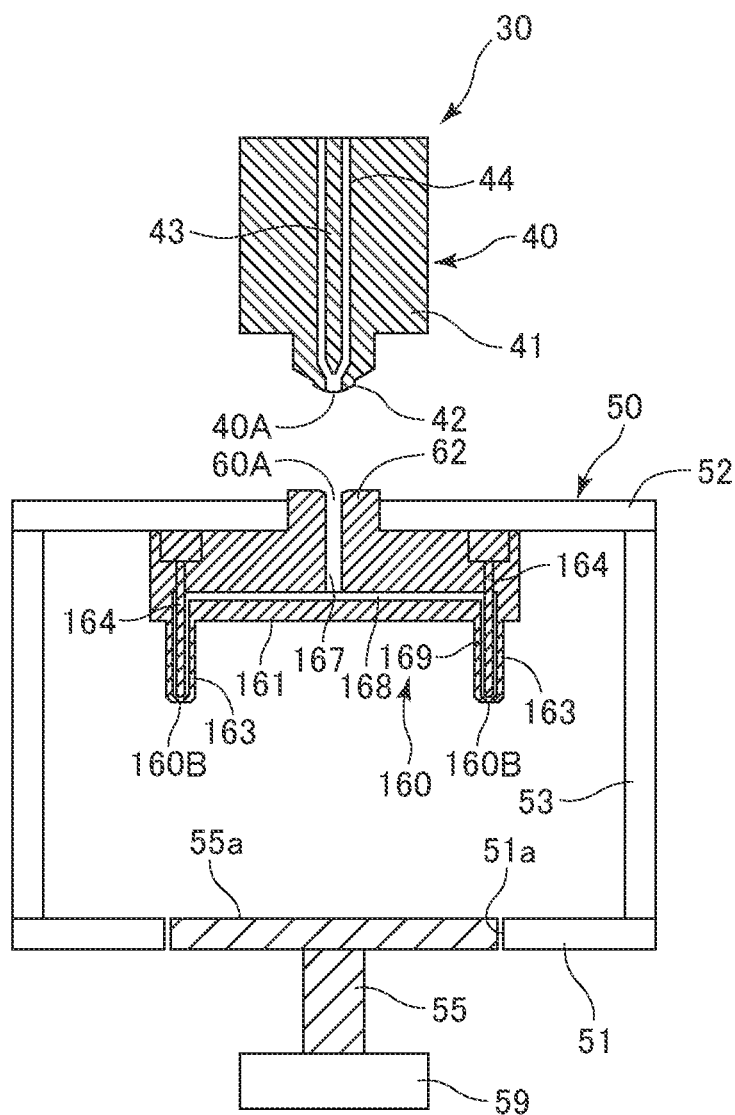
FIG. 15 is a sectional view showing a state in which the other injection nozzle for replacement is attached to the rotor placement portion in the injection apparatus.

The upper shaft portion 162 has the same shape as the upper shaft portion 62 of the runner 60 so as to be attachable to and detachable from the attachment hole 52a of the upper plate 52 of the table portion 50. As shown in FIG. 15, the runner 160 can detachably be attached to the upper plate 52 by fitting the upper shaft portion 162 to the attachment hole 52a of the upper plate 52.

Although the runner 160 is described as having the ejection ports 160B positioned with a small diameter as compared with the runner 60, the runner 160 may conversely be a runner having a large radius from the charging port to the ejection port, that is, a runner for injecting a resin into a rotor core having a large radius to the hole portion.

Summary of Present Embodiment

The rotor manufacturing apparatus (30) described above is
a rotor manufacturing apparatus (30) configured to manufacture a rotor (1) of a rotary electric machine, the rotor manufacturing apparatus (30) including:
a resin injector (40) having a first ejection port (40A) for ejecting a resin; and
a runner (60) having a charging port (60A) connectable to the first ejection port (40A), and a plurality of second ejection ports (60B) communicating with the charging port (60A) and disposed at positions associated with hole portions (1B) of a rotor core (1A) where magnet members (1M) are disposed.

By replacing the runner 60 in conformity to the shape of the rotor core 1A (rotor 1), the rotors 1 with different hole positions can be manufactured by the same resin injector 40 while eliminating the need to change the resin injector. Thus, the cost can be reduced.

The rotor manufacturing apparatus (30) further includes
a placement portion (50) on which the rotor core (1A) is placed, in which
the runner (60, 160) is detachably attached to the placement portion (50).

Thus, the runner 60 (160) can be replaced easily.

In the rotor manufacturing apparatus (30),
the placement portion (50) includes:
a support portion (52) configured such that the runner (60, 160) is attachable to and detachable from the support portion (52), and configured to position and support the runner (60, 160) when the runner (60, 160) is attached;
a placement table (55) disposed below the support portion (52), configured such that the rotor core (1A)

is placeable on the placement table (55), and configured to ascend or descend relative to the support portion (52); and a driving unit (59) configured to drive the placement table (55) to move, and the resin injector (40) is configured to inject the resin by causing the placement table (55) on which the rotor core (1A) is placed to ascend so that the hole portions (1B) of the rotor core (1A) face the second ejection ports (60B, 160B) of the runner (60, 160).

Therefore, there is no need to move the runner 60 (160) when injecting the resin into the hole portions 1B of the rotor core 1A, and to move the resin injector 40 as well. Thus, the structure of the resin injector 40 can be simplified.

In the rotor manufacturing apparatus (30), the rotor core (1A) is formed so as to have a first number of the hole portions (1B) in a circumferential direction, the runner (60, 160) has a second number of the second ejection ports (60B, 160B), the second number being smaller than the first number, and the driving unit (59) is configured to drive the placement table (55) to rotate.

When the first number of the hole portions 1B of the rotor core 1A is large and the distance between the hole portions 1B is short, the resin can be injected into all the hole portions 1B of the rotor core 1A even if the branch nozzles 63 (163) having the ejection ports 60B (160B) cannot be brought close to each other and as many ejection ports 60B (160B) as the first number of the hole portions 1B cannot be prepared.

The rotor manufacturing apparatus (30) further includes:

a first temperature control device (81) configured to control a temperature of the resin in the resin injector (40); and a second temperature control device (82) configured to control a temperature of the resin in the runner (60).

Thus, the temperature control for melting the resin in the resin injector 40 and the temperature control for dealing with the temperature change caused by the disturbance in the runner 60 (160) can be performed independently. Since the rotor core 1A placed on the placement table 55 is moved relative to the runner 60 (160), there is no need to move the runner 60 (160) and the resin injector 40 at least in the resin injection step S6. There is no need to move the temperature control device 81 and the temperature control device 82 as well.

In the rotor manufacturing apparatus (30), the runner includes a first runner (60), and a second runner (160) structured such that a radius from the charging port (160A) to the second ejection ports (160B) is different from a radius from the charging port (60A) to the second ejection ports (60B) of the first runner (60).

Even when manufacturing the rotor core 1A having a different radius to the hole portion 1B, the resin can be injected only by replacing the runner.

In the rotor manufacturing apparatus (30), the resin injector (40) includes a first valve (43) configured to open or close the first ejection port (40A), and the runner (60, 160) includes second valves (64, 164) configured to open or close the second ejection ports (60B, 160B).

Thus, the stop valve 43 can freely perform and stop the resin ejection from the runner 60 (160) to the hole portions 1B of the rotor core 1A. Further, the stop valves 64 (164) can freely perform and stop the resin ejection from the resin injector 40 to the runner 60 (160). In particular, the resin can be stopped when the runner 60 (160) is replaced.

In the rotor manufacturing apparatus (30), the runner (60, 160) is formed such that an amount of the resin to fill a part from the charging port (60A, 160A) to the plurality of second ejection ports (60B, 160B) is larger than an amount of the resin to be ejected at one time from the plurality of second ejection ports (60B, 160B) toward the hole portions (1B).

Thus, the temperature of the resin to be injected into the hole portions 1B of the rotor core 1A can be kept at an appropriate temperature inside the runner 60 (160).

A rotor manufacturing method is a rotor manufacturing method for manufacturing a rotor (1) of a rotary electric machine by disposing magnet members (1M) in hole portions (1B) of a rotor core (1A) and injecting and curing a resin to fix the magnet members (1M) to the rotor core (1A), the rotor manufacturing method including:

an injection apparatus placement step (S5) for placing the rotor core (1A) on a placement portion (50); and a resin injection step (S6) for attaching, to the placement portion (50), a runner (60) attachable to and detachable from the placement portion (50), connecting, to a charging port (60A) of the runner (60), a first ejection port (40A) for ejecting the resin in a resin injector (40), and injecting the resin from the resin injector (40) into the hole portions (1B) of the rotor core (1A) through a plurality of second ejection ports (60B) disposed at positions on the runner (60) that are associated with the hole portions (1B) of the rotor core (1A).

By replacing the runner 60 in conformity to the shape of the rotor core 1A (rotor 1), the rotors 1 with different hole positions can be manufactured by the same resin injector 40 while eliminating the need to change the resin injector. Thus, the cost can be reduced.

In the rotor manufacturing method, the placement portion (50) includes:

a support portion (52) configured such that the runner (60) is attachable to and detachable from the support portion (52), and configured to position and support the runner (60) when the runner (60) is attached;

a placement table (55) disposed below the support portion (52), configured such that the rotor core (1A) is placeable on the placement table (55), and configured to ascend or descend relative to the support portion (52); and a driving unit (59) configured to drive the placement table (55) to move, in the injection apparatus placement step (S5), the placement table (55) on which the rotor core (1A) is placed is caused to ascend so that the hole portions (1B) of the rotor core (1A) face the second ejection ports (60B) of the runner (60), and in the resin injection step (S6), the resin from the resin injector (40) is injected into the hole portions (1B) of the rotor core (1A) through the plurality of second ejection ports (60B) of the runner (60).

Therefore, there is no need to move the runner 60 when injecting the resin into the hole portions 1B of the rotor core 1A, and to move the resin injector 40 as well. Thus, the structure of the resin injector 40 can be simplified.

In the rotor manufacturing method, the rotor core (1A) is formed so as to have a first number of the hole portions (1B) in a circumferential direction, the runner (60) has a second number of the second ejection ports (60B), the second number being smaller than the first number, the driving unit (59) is configured to drive the placement table (55) to rotate, and in the resin injection step (S6), the resin is injected from the plurality of second ejection ports (60B) of the runner (60) into the second number of the hole portions (1B) of the rotor core (1A), the driving unit (59) causes the placement table (55) to descend so that the rotor core (1A) descends, causes the placement table (55) to rotate so that the rotor core (1A) rotates, and causes the placement table (55) to ascend so that the rotor core (1A) ascends, and the resin is injected from the plurality of second ejection ports (60B) of the runner (60) into the hole portions (1B) of the rotor core (1A) where the resin is not injected.

When the first number of the hole portions 1B of the rotor core 1A is large and the distance between the hole portions 1B is short, the resin can be injected into all the hole portions 1B of the rotor core 1A even if the branch nozzles 63 having the ejection ports 60B cannot be brought close to each other and as many ejection ports 60B as the first number of the hole portions 1B cannot be prepared.

In the rotor manufacturing apparatus (30), the runner includes a first runner (60), and a second runner (160) structured such that a radius from the charging port (160A) to the second ejection ports (160B) is different from a radius from the charging port (60A) to the second ejection ports (60B) of the first runner (60), and the first runner (60) or the second runner (160) is selectively attachable to the placement portion (50).

Even when manufacturing the rotor core 1A having a different radius to the hole portion 1B, the resin can be injected only by replacing the runner.

Possibilities of Other Embodiments

In the above-described present embodiment, description has been given of the case where the holding jig 10 broadly includes the lower plate 11, the pressing plate 12, the upper plate 13, and the coil springs 23. However, the present disclosure is not limited to this case. Any structure may be used as long as the rotor core 1A can be interposed and held in the stacking direction.

In the present embodiment, description has been given of the case where the resin is injected after the heating is performed to the curing start temperature of the resin or higher in the heating step S4. However, the present disclosure is not limited to this case. Preheating may be performed approximately to the melting start temperature in the heating step S4, and main heating may be performed to a processing temperature or higher in the magnet fixing step S7 after the resin injection.

In the present embodiment, description has been given of the case where the holding jig 10 is also cooled by the cooling device in the cooling step S9. However, the present disclosure is not limited to this case. The holding jig 10 may be cooled naturally. In particular, many holding jigs 10 may be prepared so that the natural cooling suffices even if the holding jigs 10 are reused.

In the present embodiment, description has been given of the case where the rotor core 1A (rotor 1) is cooled by the cooling device in the cooling step S9. However, the present disclosure is not limited to this case. As a matter of course, the cooling period can be shortened by detaching the holding jig 10 even if the rotor core 1A is cooled naturally.

In the present embodiment, description has been given of the case where the injection hole 12c in which the resin plate portion 99a and the conical portion 99b are formed is formed in the pressing plate 12 of the holding jig 10 serving as an abutment member. However, the present disclosure is not limited to this case. There may be a case where the holding jig 10 is not used, such as a case where the resin is injected while holding the rotor core 1A by another method instead of holding the rotor core 1A by using the holding jig 10. In this case, the injection hole in which the resin plate portion 99a and the conical portion 99b are formed may be formed in a different plate or the like that abuts against the rotor core 1A.

In the present embodiment, description has been given of the case where the resin plate portion 99a and the conical portion 99b are formed at the injection hole 12c, but these shapes may be any shapes. That is, the shape formed so as to protrude from the upper surface of the rotor core 1A at the enlarged opening portion may be, for example, a triangular pyramid shape, a square pyramid shape, a conical shape, or a hemispherical shape instead of the plate shape. The shape formed at the tapered portion may be, for example, a triangular pyramid shape, a square pyramid shape, a conical shape, or a hemispherical shape instead of the conical shape.

In the present embodiment, description has been given of the case where the runner 60 is detachably supported on the table portion 50. However, the runner 60 may directly be fixed to and supported on, for example, the nozzle portion 42 of the resin injector 40. Further, the runner 60 may be supported on a member other than the table portion 50.

In the present embodiment, description has been given of the case where the rotor core 1A is placed on the placement table 55 and caused to ascend toward the runner 60 so that the ejection ports 60B face the hole portions 1B of the rotor core 1A via the injection holes 12c. However, the present disclosure is not limited to this case. The rotor core 1A may be moved in any direction depending on the orientations of the resin injector 40 and the runner 60. That is, any structure may be used as long as the resin injector 40 and the runner 60 are not moved at least in the resin injection step S6.

In the present embodiment, description has been given of the case where the temperature control device 81 controls the temperature of the resin injector 40 and the temperature control device 82 controls the temperature of the runner 60. However, the present disclosure is not limited to this case. For example, a single temperature control device may perform the temperature control. Conversely, more temperature control devices may be used to subdivide the temperature control on the resin injector 40 and the runner 60.

In the present embodiment, description has been given of the case where the resin injector 40 has the same structure as a so-called compression molding resin injector that compresses and ejects a molten resin. However, the present disclosure is not limited to this case. For example, the resin injector 40 may be a so-called transfer molding resin injector that puts a preheated resin material into a transfer chamber and then ejects the resin material.

INDUSTRIAL APPLICABILITY

The rotor manufacturing apparatus and the rotor manufacturing method can be used when manufacturing a rotor of a rotary electric machine, and are particularly suitable for use in a case requiring the manufacture of rotors with different hole positions using the same resin injector.

DESCRIPTION OF THE REFERENCE NUMERALS

1 . . . rotor
1A . . . rotor core
1B . . . hole portion
1M . . . magnet member (magnet)
30 . . . rotor manufacturing apparatus (resin injection apparatus)
40 . . . resin injector
40A . . . first ejection port (ejection port)
43 . . . first valve (stop valve)
50 . . . placement portion (table portion)
52 . . . support portion (upper plate)
55 . . . placement table
59 . . . driving unit (driving device)
60 . . . runner
60A . . . charging port
60B . . . second ejection port (ejection port)
64 . . . second valve (stop valve)
81 . . . first temperature control device (temperature control device)
82 . . . second temperature control device (temperature control device)
160 . . . runner
160A . . . charging port
160B . . . second ejection port (ejection port)
164 . . . second valve (stop valve)
S5 . . . injection apparatus placement step
S6 . . . resin injection step

The invention claimed is:

1. A rotor manufacturing apparatus configured to manufacture a rotor of a rotary electric machine, the rotor manufacturing apparatus comprising:
a resin injector having a first ejection port for ejecting a resin;
a runner having a charging port connectable to the first ejection port, and a plurality of second ejection ports communicating with the charging port and disposed at positions associated with hole portions of a rotor core where magnet members are disposed; and
a placement portion on which the rotor core is placed, wherein:
the runner is detachably attached to the placement portion,
the placement portion includes:
a support portion configured such that the runner is attachable to and detachable from the support portion, and configured to position and support the runner when the runner is attached;
a placement table disposed below the support portion, configured such that the rotor core is placeable on the placement table, and configured to ascend or descend relative to the support portion; and
a driving unit configured to drive the placement table to move, and
the resin injector is configured to inject the resin by causing the placement table on which the rotor core is placed to ascend so that the hole portions of the rotor core face the second ejection ports of the runner.

2. The rotor manufacturing apparatus according to claim 1, wherein
the rotor core is formed so as to have a first number of the hole portions in a circumferential direction,
the runner has a second number of the second ejection ports, the second number being smaller than the first number, and
the driving unit is configured to drive the placement table to rotate.

3. The rotor manufacturing apparatus according to claim 1, further comprising:
a first temperature control device configured to control a temperature of the resin in the resin injector; and
a second temperature control device configured to control a temperature of the resin in the runner.

4. The rotor manufacturing apparatus according to claim 1, wherein the runner can either be a first runner or a second runner, the second runner being structured such that a second radius from the charging port to the second ejection ports is different from a first radius from the charging port to the second ejection ports of the first runner.

5. The rotor manufacturing apparatus according to claim 1, wherein
the resin injector includes a first valve configured to open or close the first ejection port, and
the runner includes second valves configured to open or close the second ejection ports.

6. The rotor manufacturing apparatus according to claim 1, wherein the runner is formed such that an amount of the resin to fill a part from the charging port to the plurality of second ejection ports is larger than an amount of the resin to be ejected at one time from the plurality of second ejection ports toward the hole portions.

7. A rotor manufacturing method for manufacturing a rotor of a rotary electric machine by disposing magnet members in hole portions of a rotor core and injecting and curing a resin to fix the magnet members to the rotor core, the rotor manufacturing method comprising:
an injection apparatus placement step for placing the rotor core on a placement portion; and
a resin injection step for attaching, to the placement portion, a runner attachable to and detachable from the placement portion, connecting, to a charging port of the runner, a first ejection port for ejecting the resin in a resin injector, and injecting the resin from the resin injector into the hole portions of the rotor core through a plurality of second ejection ports disposed at positions on the runner that are associated with the hole portions of the rotor core, wherein:
the placement portion includes:
a support portion configured such that the runner is attachable to and detachable from the support portion, and configured to position and support the runner when the runner is attached;
a placement table disposed below the support portion, configured such that the rotor core is placeable on the placement table, and configured to ascend or descend relative to the support portion; and
a driving unit configured to drive the placement table to move,
in the injection apparatus placement step, the placement table on which the rotor core is placed is caused to ascend so that the hole portions of the rotor core face the second ejection ports of the runner, and
in the resin injection step, the resin from the resin injector is injected into the hole portions of the rotor core through the plurality of second ejection ports of the runner.

8. The rotor manufacturing method according to claim 7, wherein
- the rotor core is formed so as to have a first number of the hole portions in a circumferential direction,
- the runner has a second number of the second ejection ports, the second number being smaller than the first number,
- the driving unit is configured to drive the placement table to rotate, and
- in the resin injection step,
- the resin is injected from the plurality of second ejection ports of the runner into the second number of the hole portions of the rotor core,
- the driving unit causes the placement table to descend so that the rotor core descends, causes the placement table to rotate so that the rotor core rotates, and causes the placement table to ascend so that the rotor core ascends, and
- the resin is injected from the plurality of second ejection ports of the runner into the hole portions of the rotor core where the resin is not injected.

9. The rotor manufacturing method according to claim 7, wherein
- the runner can either be a first runner or a second runner, the second runner being structured such that a second radius from the charging port to the second ejection ports is different from a first radius from the charging port to the second ejection ports of the first runner, and
- the first runner or the second runner is selectively attachable to the placement portion.

\* \* \* \* \*